May 22, 1973  D. G. PETCOFF  3,734,693

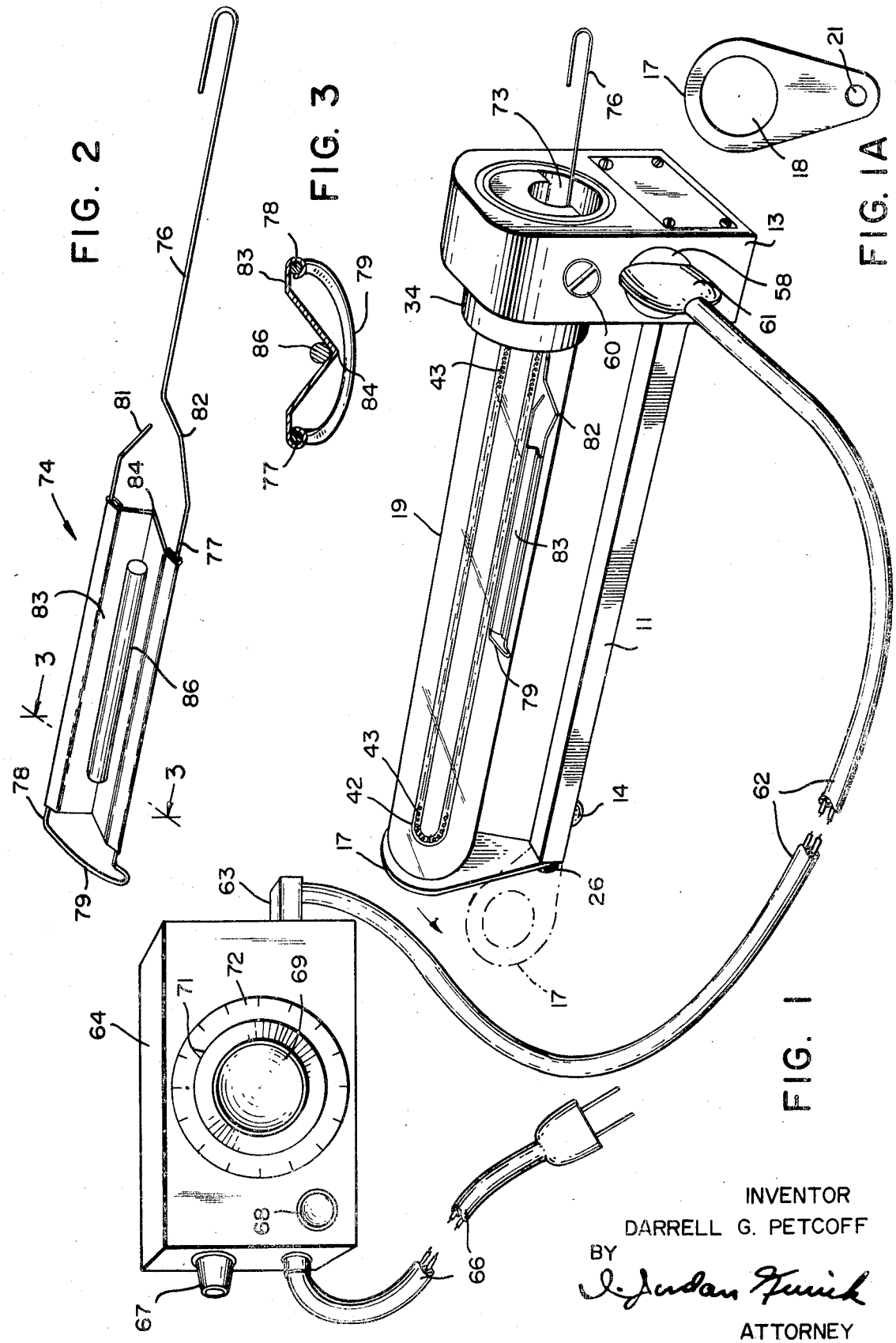

APPARATUS FOR DRYING AND DEVELOPING CHROMATOGRAMS

Filed Aug. 9, 1971  2 Sheets-Sheet 2

INVENTOR
DARRELL G. PETCOFF
BY
ATTORNEY

United States Patent Office 3,734,693
Patented May 22, 1973

3,734,693
APPARATUS FOR DRYING AND DEVELOPING CHROMATOGRAMS
Darrell G. Petcoff, Hamilton, Mont., assignor to Ivan Sorvall, Inc., Newton, Conn.
Filed Aug. 9, 1971, Ser. No. 170,022
Int. Cl. F27b 5/14; F27d 11/00; G01n 31/08
U.S. Cl. 23—253 PC                          5 Claims

ABSTRACT OF THE DISCLOSURE

Apparatus and method for both drying and developing chromatograms safely in a single equipment into which they are removably inserted and processed within a confined heat controlled enclosure. A feature of the invention is the provision of an elongated heating element supported at one end by a block and a removable tubular enclosure also supported by said block and forming a heating chamber around said heating element. Spring means are provided for releaseably securing said tubular element around said heating element. The apparatus comprises readily assembled and disassembled components which are corrosion-resistant and are easily cleaned.

BACKGROUND OF THE INVENTION

Field of the invention

This invention relates to chromatography and, more particularly, to a single apparatus for both steps of drying and developing chromatograms or chromatography sticks in order to render visible the sample components separated by the chromatography process in said chromatograms or sticks.

Description of the prior art

Previous procedures for visualizing component bands on chromatograms or chromatography sticks are described by Ribi, et al., Journal of Bacteriology 102, 250–260 (1970). The acid charring method involved the following: The sticks, supported on flat, grooved aluminum foil trays, are dried in a small drying oven, such as the Thelco Model 18, at 50°–60° C. for five to fifteen minutes until the drying solvent (the eluant or mobile phase) has evaporated from the sticks. Then the tray and stick are removed to a hood and sprayed with a mixture of chromic acid and sulfuric acid (Stahl reagent No. 46) with a Desaga sprayer. The tray and stick are then moved to an iron plate which is heated by a gas burner or, alternately, a small hot plate, in order to char or develop the substances on the stick and render them visible. A similar process used in thin layer chromatography is described in Thin-Layer Chromatography, 2nd ed., E. Stahl, ed., New York, Springer-Verlag, 1969, p. 79–81.

The disadvantages of the foregoing lie in the fact that an acid is required to be sprayed on the chromatography stick thereby requiring a sprayer and a propellant supply. Furthermore, the use of the acid results in considerable untidiness and corrosion caused by the spray in the hood that is used for the purpose. Further, since the chromatography stick is light and fragile, there is an ever present probability that it can be blown off the tray by the propellant. Additionally, the matter of handling the chromatography stick and transporting it from one place to another in the laboratory, increases the danger of accidents to the fragile stick and increases the handling time. As for heating the tray and the stick by a gas burner or a hot plate, there is comparatively little control as to the intensity of the heat and its distribution throughout the chromatography stick.

SUMMARY OF THE INVENTION

The foregoing disadvantages are overcome by the apparatus of the present invention whereby spraying of acid on the stick is eliminated, thereby eliminating the need for a sprayer and propellant supply, and consequent corrosion of a ventilating hood. By providing a single apparatus in which the fuming of the acid and the subsequent heating occur in a single location and within a substantially closed chamber, at least one handling step of the delicate and fragile chromatography stick is eliminated. Furthermore, the amount of acid used and the heat duration and intensity can be closely controlled, giving more uniform and reproducible results. The apparatus herein is useful both for treatment of chromatography sticks and also for visualization of thin-layer chromatograms.

The apparatus herein comprises a framework which yieldably supports a removable tubular enclosure in which is located an elongated heating element, a tray of special shape that is removably inserted into said enclosure, said tray supporting a chromatogram or chromatography stick in a suitable position relative to the heating element. The enclosure is transparent or translucent whereby the chromatogram is visible to the operator during the heating process so that the proper timing of the exposure thereof to heat and to sublimating or fuming developing agents can be controlled. An auxiliary timing element may optionally be connected to the heating element.

BRIEF DESCRIPTION OF THE DRAWINGS

FIG. 1 is a perspective view of the apparatus of the present invention showing the heating oven and developing chamber, the control unit for timing the duration of the heating process, and a chromatogram tray resting in the heating oven;

FIG. 1–A is an elevation of the heating oven tube spring support;

FIG. 2 is an enlarged perspective view of the chromatogram tray containing a chromatogram thereon;

FIG. 3 is a further enlarged section view taken on line 3—3 of FIG. 2;

DESCRIPTION OF THE PREFERRED EMBODIMENTS

Figure 4:
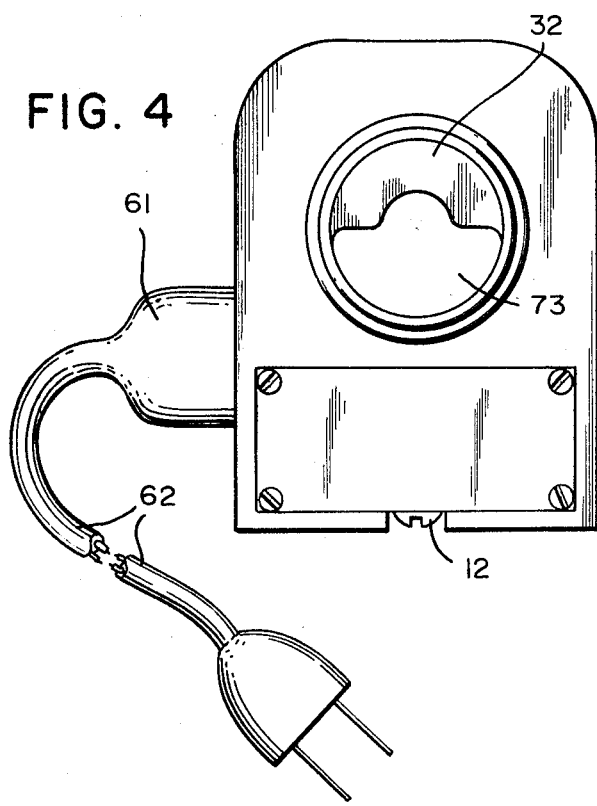
FIG. 4 is an enlarged end view of the heater support block shown in FIG. 1.
Figure 5:
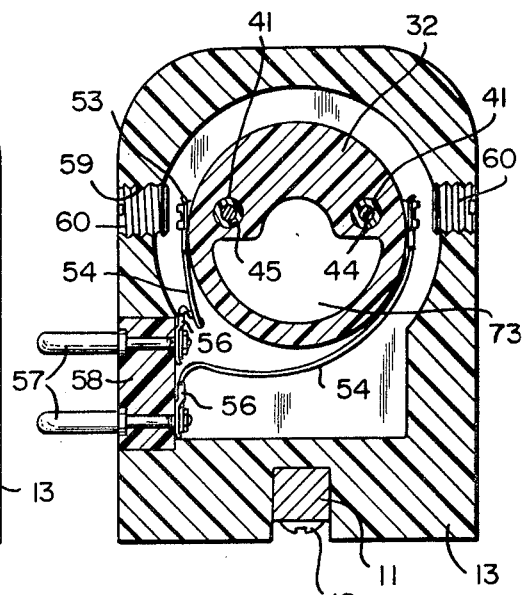
FIG. 5 is a substantially vertical central section view of the support block shown in FIG. 4, taken approximately on line 5—5 of FIG. 6, some parts being shown in elevation and some parts being omitted.

Referring now to the drawings in detail, the apparatus of the present invention is supported on a frame or rod 11 made of a suitable metal, or the like, one end portion of said rod being connected by a pair of spaced bolts 12 to the bottom recessed central portion of a support block 13. Secured to the bottom of the other outer end portion of rod 11 is a round-headed foot 14 made of metal or the like, the bottom of said foot being substantially on the same plane as the bottom of support block 13 whereby rod 11 is maintained in a substantially horizontal position when the apparatus rests upon a laboratory table or the like. See FIGS. 1, 4 and 5. Stability of the apparatus against tipping is provided by the suitable width of block 13.

Figure 6:
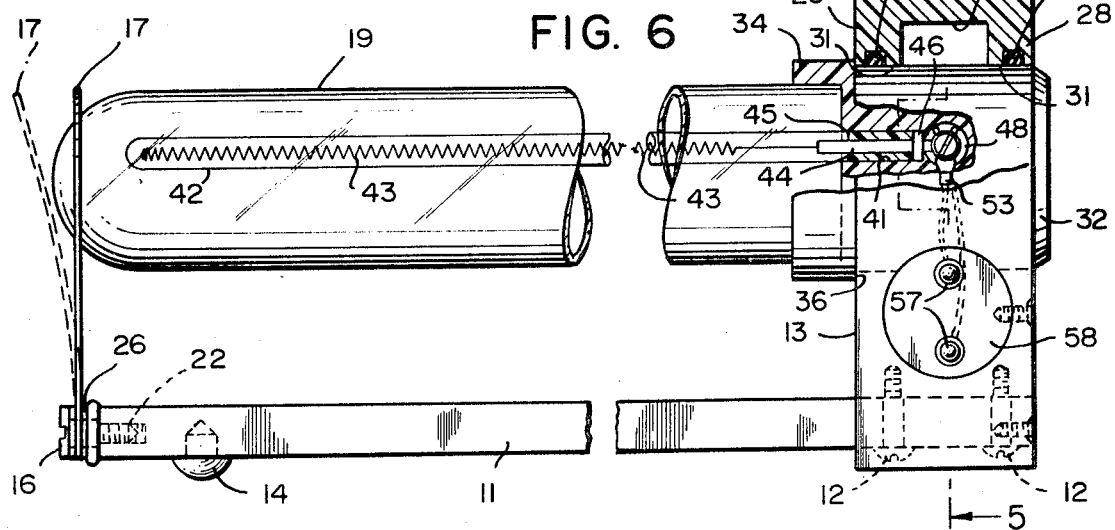
FIG. 6 is a broken side elevation of the heater shown in FIG. 1, some parts being shown in cross-section, some parts in elevation, and some parts being omitted.

Connected to the outer end of rod 11 by means of a screw 16 is the lower portion of a support spring 17 made of stiff but resilient sheet metal, or the like, the upper wider portion of said spring having a circular aperture 18 which is adapted to engage and support the closed end of an elongated oven tube 19 made of a heat resistant, transparent material such as Pyrex, or the like. Spring 17 has a bottom aperture 21 through which the shank of screw 16 extends and engages a suitable threaded aperture 22 in the end of rod 11. See FIGS. 1A and 6. While secured to the end of rod 11, spring 17 is nevertheless rotatable around the shank of screw 16. Spring 17 is positioned relative to block 13 whereby it normally urges the other open end of tube 19 into engagement with another support component that will be described hereinafter. The location of spring support 17 may be adjusted by means of the inclusion of one or more suitable washers 26 whereby the biasing action of said spring support will ensure the safe and secure position of tube 19 in the apparatus. In order to provide said adjustability, rod 11 may be made somewhat shorter than may be optimally calculated whereby additional washers 26 or a suitably selected number of washers of different thicknesses may be added or subtracted in accommodating to the length of tube 19.

Block 13 has a generally rectangular shape except for the upper curved shoulders thereof and is preferably made of a suitable plastic material that is inert to acid fumes, such as high-density polyethylene, polyvinyl chloride, or the like.

Block 13 has an interior chamber 27 bounded by an outside wall 28 and an inside wall 29. Walls 28 and 29 have coaxial circular apertures 31 of identical diameter through which extends a removable, circular plug 32 made of acid fume-resistant and heat-resistant plastic material such as Teflon, or the like. Apertures 31 have suitable spaced annular recesses which accommodate respective resilient O-rings 33 of acid-resistant material that surround the adjacent surfaces of plug 32 and facilitate insertion and withdrawal thereof. Plug 32 has an integrally formed annular collar 34 whose outside diameter is somewhat larger than that of said plug and whose shoulder 36 serves to locate said plug in its proper position within block 13 when abutting against the outer surface of inside wall 29. The annular surface portion of plug 32, bounded by lip 34, serves as an abutment against which the open ended mouth of tube 19 is urged by the action of spring 17.

Figures 7, 8:
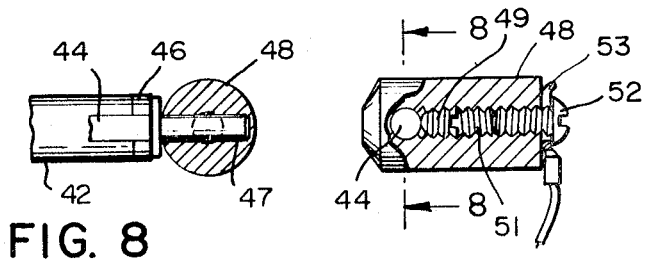
FIG. 7 is a greatly enlarged view of a subassembly portion of FIG. 6 showing the manner in which one of the connecting wires is electrically connected to a corresponding terminal of the heater element.
FIG. 8 is a fragmentary view taken on line 8—8 of FIG. 7.

Plug 32 has a pair of spaced apart apertures 41 (FIGS. 5 and 6) which accommodate the respective end portions of two substantially parallel legs of a protective heat-resistant U-shaped tube 42 made of quartz or Vycor. Extending through the interior of tube 42 is a coiled Nichrome U-shaped electrical resistance heating element 43, the ends of which are connected, respectively, to electrically conductive terminals 44 supported in the ends of tube 42 in insulating washers 46 made of acid fume-resistant and heat-resistant materials such as ceramic, plastic, or the like. The U-tube 42 is cemented and sealed into plug 32 with a heat and acid fume-resistant cement 45 that fills the space around the ends of U-tube 42 within apertures 41. The portions of terminals 44 protruding beyond the ends of tube 42 extend into respective close-fitting apertures 47 in bushings 48 which are aligned axially and laterally in plug 32 and which are made of electrically conductive material such as brass or the like. The end of each terminal 44 is secured in its respective bushing 48 by means of a small set screw 49 threadably inserted into threaded aperture 51 arrayed perpendicularly to and intersecting aperture 47. Secured to the outer end of each bushing 48 by means of screw 52 is a U-shaped connector lug 53, said screw engaging threaded aperture 51 of said bushing. See FIGS. 6, 7 and 8. Lugs 53 are connected by means of conductor wires 54 to corresponding lugs 56 which, in turn, are electrically connected to respective spaced terminal pins 57 in connector plug 58 secured in the side wall of block 13. Plug 58 is secured and sealed in block 13 by a coating of acid fume-resistant cement such as epoxy, or the like. The two opposite sides of support block 13 have apertures 59 arrayed directly opposite the outer ends of respective bushings 48 to provide access thereto for manipulating set screws 49 and screws 52. Apertures 59 are closed by screws 60 which are made of the same material as support block 13 and which effectively seal apertures 59 to prevent fumes and vapors from passing therethrough. See FIG. 5.

Detachably connnected to pins 57 is a socket plug 61 which forms one end of an electric connector cord 62, the other end of which comprises a plug 63 which is detachably connectable to a suitable control unit 64. See FIG. 1. Control unit 64 is comparable to a commercially available light dimmer control, and contains a solid state element such as a thyristor which can continuously vary the voltage supplied to heater element 43 between zero and full line voltage, said unit being connected to a power source, not shown, by means of a line cord 66. Control unit 64 is provided with a holder 67 containing a 5 ampere, 125 volt fuse. Control unit 64 also has a neon pilot light 68 to indicate, when lit, that power is being applied to heater element 43. The manually operated rotatable knob 69 on the control unit has a pointer 71 which movably scans a stationary dial 72 which is graduated in voltage units. By providing for detachability from the control unit by way of line cord 62, the entire oven apparatus may be immersed in water for washing purposes. The bottom portion of plug 32 has an arcuately bounded aperture 73 extending therethrough for providing access to the heating area of the oven within tube 19. See FIGS. 1 and 5. Removably insertable through an aperture 73 and into oven tube 19 is a tray, generally designated 74, whose frame is made of a unitary wire bent into a shape to form a handle portion 76, and substantially parallel rails 77 and 78, rail 77 being integrally joined with handle 76. See FIG. 2.

The outer end of rails 77 and 78 are integrally joined by a downwardly curved bight 79, the bottom of which rests upon the curved bottom of oven tube 19. The inner end of rail 78 is bent downwardly to form a leg 81, the lower end of which rests upon the lower inner wall of oven tube 19. Handle 76 is arrayed substantially parallel to, but intermediately aligned between, imaginary lines extending from rails 77 and 78. That portion of the wire between handle 76 and rail 77 is formed in an angle bight 82, the bottom of which is arrayed substantially in a horizontal plane with the lower end of leg 81 and with the bottom surface of bight 79, thereby forming a stable support for tray 74.

Support tray 83 on the wire frame is formed by a generally rectangular piece of stiff but flexible metal foil such as aluminum, or the like, the longitudinal edges of which are rolled over respective rails 77 and 78 while the central longitudinal portion is formed into a V-shaped or U-shaped bight 84. The metal foil of which support tray 83 is made has sufficient stiffness so that the V-shaped bight 84 retains its form during several successive operations and while transporting a chromotogram in and out of oven tube 19 and to a laboratory table for further treatment and analysis.

Nestable in the V-shaped foil of bight 84 is an elongated chromatogram 86 which is the object that is treated and processed by the apparatus herein.

OPERATION

One type of chromatogram or chromatography stick 86 that is processed by the apparatus herein is produced as a result of the operation of the apparatus described in a co-pending United States patent application entitled "Centrifugal Chromatography Apparatus and System," Ser. No. 95,546, filed Dec. 7, 1970.

The moist chromatogram, in the form of an elongated rod, must first be dried before it is treated and charred in order to render visible the chromatogram patterns thereon. Accordingly, the apparatus herein must first be used to dry the chromatography stick 86 by mounting it upon tray 74 and inserting it through aperture 73 into oven tube 19. If better air circulation is desired, a tube open at both ends may be substituted for tube 19.

The apex of bight 84 of tray 74 is located in a position where the chromatography stick 86 is substantially equidistant from both parallel legs of quartz heater tube 42 whereby even heating of the stick is accomplished. By means of a switch, not shown, which may be integrated with knob 69 or with line cord 66, power voltage is transmitted to heater element 43 at a comparatively low voltage setting of knob 69 and initial drying of stick 86 takes place. The time required for drying is usually between about 3 to 15 minutes and this can be established empirically by the laboratory technician.

After the chromatogram 86 has been properly dried, it is removed on tray 74 and set aside temporarily in order to prepare the chromatography oven for the subsequent charring process. The top of support spring 17 is retracted so that it is free from the outer closed end of tube 19, after which it is rotated on the shaft of screw 16 so that tube 19 may be withdrawn to the left to remove it from the apparatus.

Thereafter, several drops of concentrated sulfuric acid are applied along the surface of both branches of quartz tube 42, approximately three drops each, said sulfuric acid spreading and adhering thereto by capillary action or surface tension.

Subsequently, tube 19 is then returned over tube 42 into position where its open end abuts the interior vertical wall of plug 32 surrounded by collar 34, after which spring 17 is moved back into a vertical position while retracted, and then released so that the annular rim of aperture 18 bears against the closed end of tube 19 and urges the latter into a retained and secure position. The dried chromatogram 86 on tray 74 is then re-inserted through aperture 73 in plug 32 into a position where it rests beneath tube 42 and substantially equidistantly from both branches thereof. Bights 79 and 82 and the lower end of leg 81 support chromatography stick 86 in a substantially horizontal position which is substantially parallel to both branches of U-shaped hater tube 42.

The heating element 43 is then electrically energized by switching on the control unit 64 and setting knob 69 to a suitable position for causing the sulfuric acid to fume. In some instances, the control would be set at a high heat level at approximately 60–70 volts, but the optimum voltage could be determined empirically and would vary with different types of sample chromatograms.

After the heating element 43 is energized, the acid fumes begin to evolve after about 5–10 seconds and charring of chromatogram 86 takes place, this process lasting approximately two minutes or more for best results. In some cases, it may be required to continue heating a new sample chromatogram until the bands start to lighten so as to ascertain approximately what amount of time is required to fully develop a chromatography stick. Often, the contrast between bands and the background improves with continued heating beyond the initial appearance of the bands. Although the control element 64 may be adjusted to pass the full line voltage of the 110 volt to heating element 43, it is found that slow heating at approximately 60 to 70 volts appears to give the best results.

In some cases, banding on the chromatogram can be revealed by fuming the sticks with iodine. In such cases, two or more coats of a saturated alcohol solution of iodine are applied with a medicine dropper to the quartz tube 42 which is at room temperature, each coat being allowed to dry before the next coat is applied. With iodine treatment, a low setting of the control element 64 suffices as, for example, between 30–40 volts which effectively sublimes the iodine. Development is rapid and the chromatography stick should be removed before the background becomes colored.

Other suitable band-revealing agents may be applied to heater tube 42 for developing various types of chromatograms by means of the apparatus herein.

By virtue of the novel structure of the apparatus herein, the processing of chromatogram sticks can now be conducted on a controlled heating and timing basis whereby the stick is clearly visible through the transparent oven tube 19, and is located at a controlled and reproducible distance from the heating element. Furthermore, the support block 13 and plug 32, being made of Teflon, or the like, are resistant to acid fumes and provide for isolation of the fuming chamber from the electrical connections by virtue of the open end of tube 19 being urged into airtight abutment against plug 32 while communication between the interior of tube 19 and the exterior of the apparatus takes place only through aperture 73 of plug 32.

In some embodiments, an annular gasket, not shown, of acid-resistant and impervious material may be interposed between the open end of tube 19 and plug 32 to provide an airtight seal.

The apparatus herein is easily dismantled by retracting and rotating spring support 17 and removing tube 19 which can then be readily washed. Furthermore, when the plug of line cord 62 is removed from connector plug 58, the remaining complete assembly of support block 13 and plug 32 with quartz heater tube 42 may be immersed in a suitable washing solution for cleaning.

As used throughout the specification and claims herein, the word "chromatogram" is intended also to subsume chromatography sticks, thin-layer chromatograms, and the like.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

I claim:

1. A chromatogram processing apparatus comprising a base, a support block mounted on said base, an elongated heater element mounted at one end in said support block and extending laterally therefrom, a tubular enclosure element removably extending over said heater element, the inner end of said enclosure element being engaged and supported at least in part by said block, said enclosure element forming a heating chamber in the region of and around said heater element, an aperture in said block aligned with said enclosure element, a chromatogram tray removably insertable through said aperture into said heating chamber and a spring element on said base spaced apart from said block, said spring element yieldably engaging the outer end of said enclosure element normally to urge the other end thereof into engagement with said block.

2. Apparatus according to claim 1 wherein said spring element is movable laterally relative to said base to permit the removal and replacement of said enclosure elemnt relative to said heater element and said block.

3. Apparatus according to claim 1 and further comprising spacer elements removably mounted on said base in cooperation with said spring element for adjusting and determining the location thereof relative to said block.

4. Apparatus according to claim 1 wherein said tray comprises a metal foil material, said apparatus further comprising a tray holder made of a unitary length of wire formed into a handle portion and two spaced parallel rails, said tray being mounted on and between said rails and supported thereby.

5. Apparatus according to claim 4 wherein said metal foil has an elongated V-shaped groove within which said chromatogram is supported in alignment with said heater element.

References Cited

UNITED STATES PATENTS

| | | | |
|---|---|---|---|
| 699,146 | 5/1902 | Carr | 23—253 PC X |
| 3,186,801 | 6/1965 | Hampton | 23—253 PC |
| 3,304,159 | 2/1967 | Hinsvark | 23—253 PC X |
| 3,053,919 | 9/1962 | Poole et al. | 13—20 X |
| 2,671,123 | 3/1954 | Shervick | 23—253 PC X |
| 3,084,031 | 4/1963 | Kuck et al. | 23—253 PC |
| 3,406,018 | 10/1968 | Rosin et al. | 23—253 PC |
| 3,427,432 | 2/1969 | Bills et al. | 219—275 |

OTHER REFERENCES

E. Stahl: Thin-Layer Chromatography, p. 79–81, 2nd ed. (1969).

JOSEPH SCOVRONEK, Primary Examiner

U.S. Cl. X.R.

23—230 R, 230 PC, 253 R; 118—49.5; 219—275, 390; 338—318